United States Patent [19]

Trepka

[11] 4,297,464

[45] Oct. 27, 1981

[54] ORTHOESTERS AS COUPLING AGENTS FOR PRODUCING MONOVINYLARENE HOMOPOLYMERS

[75] Inventor: William J. Trepka, Bartlesville, Okla.

[73] Assignee: Phillips Petroleum Co., Bartlesville, Okla.

[21] Appl. No.: 178,402

[22] Filed: Aug. 15, 1980

Related U.S. Application Data

[62] Division of Ser. No. 5,625, Jan. 22, 1979, Pat. No. 4,238,576.

[51] Int. Cl.$^3$ .......................... C08F 4/46; C08F 8/06; C08F 8/14
[52] U.S. Cl. .................................. 526/181; 525/153; 525/385; 525/386
[58] Field of Search ................ 526/181; 525/153, 385, 525/386

[56] References Cited

U.S. PATENT DOCUMENTS

| | | | |
|---|---|---|---|
| 3,281,383 | 10/1966 | Zelinski et al. | 260/23.7 |
| 3,551,392 | 12/1970 | Snyder et al. | 260/78.4 |
| 3,580,895 | 5/1971 | Onishi et al. | 260/83.7 |
| 3,594,452 | 7/1971 | De La Mare | 260/880 |
| 3,637,554 | 1/1972 | Childers | 260/23.7 R |
| 3,773,732 | 11/1973 | Dillenchneider | 260/85.1 |
| 3,803,266 | 4/1974 | Kahle et al. | 260/879 |
| 3,993,854 | 11/1976 | Uraneck et al. | 260/94.2 |
| 4,020,258 | 4/1977 | Farrov | 526/178 |
| 4,238,576 | 12/1980 | Trepka | 525/271 |

FOREIGN PATENT DOCUMENTS 1276320  6/1972  United Kingdom .

*Primary Examiner*—William F. Hamrock

[57] ABSTRACT

Orthoesters are used to couple living homopolymers of monovinylarenes.

4 Claims, No Drawings

ORTHOESTERS AS COUPLING AGENTS FOR PRODUCING MONOVINYLARENE HOMOPOLYMERS

This application is a division of my copending application Ser. No. 005,625 filed Jan. 22, 1979, now U.S. Pat. No. 4,238,576.

FIELD OF THE INVENTION

This invention relates in one aspect to a method of coupling living polymers and to the polymers per se so prepared. In another aspect, it relates to a method of selectively coupling living copolymers.

BACKGROUND OF THE INVENTION

It has long been known to prepare coupled polymers by polymerizing conjugated dienes and/or monovinylarenes in the presence of an organomonolithium initiator to produce polymer containing an active lithium atom on one end of the polymer chain (such a polymer called polymer lithium and often referred to as living polymer). Coupled polymers are formed by reacting the polymer lithium with a coupling agent (i.e., a compound capable of reacting with at least two polymer lithiums).

A wide variety of coupling agents are known including esters, diesters, and polyesters. However, there are no known reports in the art of any coupling agent being specific to monovinylarenyllithium-terminated living polymers and essentially not coupling conjugated dienyllithium-terminated living polymers. A monovinylarenyllithium-terminated living polymer is defined to be a living polymer in which the lithium atom is attached to a terminal monovinylarenyl group in a polymer molecule.

An object of this invention is to couple polymer lithiums.

Another object of this invention is to produce coupled polymers.

Yet another object of this invention is to selectively couple particular polymer lithiums.

A further object of this invention is to couple homopolymers formed from monovinylarene monomers and to couple copolymers comprising polymerized conjugated diene monomers and monovinylarene monomers.

A still further object of this invention is to couple monovinylarenyllithium-terminated living homopolymers and copolymers.

It is also an object of this invention to couple monovinylarenyllithium-terminated living polymers selectively, under conditions wherein conjugated dienyllithium-terminated living polymers are essentially not coupled.

STATEMENT OF THE INVENTION

According to the invention, orthoesters are used as coupling agents to couple styryllithium-terminated polymer lithiums, said polymer lithiums comprising copolymers of conjugated dienes and monovinylarenes and homopolymers of monovinylarenes, said copolymers being coupled by adding the coupling agent after polymerization is substantially complete, in contradistinction to its being added at the beginning of polymerization, and said monovinylarene homopolymers being coupled by adding the coupling agent either before or after polymerization is substantially complete. In another embodiment, orthoesters are used as selective coupling agents, coupling monovinylarenyllithium-terminated living polymers but essentially not coupling conjugated dienyllithium-terminated living polymers. In yet another embodiment, novel polymers are prepared by the process embodiments recited above.

PREFERRED EMBODIMENTS OF THE INVENTION

Although many different types of coupling agents have been disclosed in the art, including simple diesters and multiesters, orthoesters have not been disclosed as coupling agents. A particular orthoester, triethyl orthoformate, has been disclosed in the art as a vinyl promoter and randomizer, being added at the beginning of polymerization along with a mixture of monomers being polymerized. However, it has not been recognized that orthoesters will also couple polymers, a function which is quite unexpected in view of its prior use as a randomizer and vinyl promoter.

Although the following is written particularly in terms of using the orthoester triethyl orthoformate (TEOF) as the coupling agent, it is expected that other orthoesters will also give good results. Orthoesters have the general formula

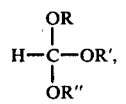

wherein R, R' and R" are the same or different and are individually selected from alkyl groups; generally the alkyl groups have from 1 to about 4 carbon atoms. Besides TEOF, examples of other suitable orthoesters include but are not limited to trimethyl orthoformate, methyl diethyl orthoformate, and tripropyl orthoformate.

The orthoester can be added neat, or for convenience it can be added as a dilute solution in an inert diluent, described below. The coupling agent can be added as a batch, or alternately it can be added incrementally or continuously.

The amount of orthoester which will be used to couple styryllithium-terminated living polymers according to the invention can vary broadly but will generally be used in an amount within the range from about 0.05 to about 20 moles of orthoester per mole of lithium in polymer and more often will be within the range from about 1.5 to about 10 moles of orthoester per mole of lithium in polymer.

The monomers which will generally be used in this invention include monovinylarene monomers and conjugated diene monomers.

The conjugated dienes which will generally be used in this invention can be selected broadly but will generally contain from 4 to about 12 carbon atoms per molecule. Examples of some suitable monomers include 1,3-butadiene, isoprene, 2,3-dimethyl-1,3-butadiene, 3-butyl-1,3-octadiene, 2-phenyl-1,3-butadiene, and mixtures thereof. Especially preferred is 1,3-butadiene due to its usual availability and favorable cost.

Monovinylarene monomers used in this invention can be selected broadly but will generally contain 8 to about 20 carbon atoms per molecule. Suitable monovinylarene monomers can contain alkyl, cycloalkyl, and aryl substituents, as well as combinations thereof. Generally, the total number of carbon atoms in the combined substituents will not be greater than 12. Examples of some suitable monovinylarene monomers include styrene, alpha-methylstyrene, 3-methylstyrene, 4-n-propylstyrene, 4-cyclohexylstyrene, 4-dodecylstyrene, 2-ethyl-4-benzylstyrene, 4-p-tolylstyrene, and 1-vinylnaphthalene. Styrene is presently preferred because of its usual availability and effectiveness.

The polymer lithiums suitable for coupling with the orthoesters of this invention are living homopolymers of monovinylarenes and monovinylarenyllithium-terminated living copolymers of monovinylarenes and conjugated dienes. Although the examples included below do not specifically include coupling of living homopolymers of monovinylarenes, the coupling behavior of living copolymers having terminal monovinylarenyllithium provides solid support for predicting the coupling behavior of the homopolymers. The living polymers may have block, random, or tapered structure, or combinations thereof.

Any suitable organo alkali metal initiator can be employed; however, an organolithium initiator will generally be used. Such organolithium initiators generally are represented by the formula RLi, wherein R is a hydrocarbon radical (and can be aliphatic, cycloaliphatic, or aromatic or mixtures thereof). The number of carbon atoms (and consequently the molecular weight) of the hydrocarbon lithium initiator is not believed to influence appreciably the operability and thus most any hydrocarbon lithium initiator can be employed. Initiators having up to about 20 carbon atoms are generally used, however, because they are more readily available than those having higher molecular weights. Most frequently employed are aliphatic monolithium initiators. Examples of some suitable species include n-butyllithium, sec-butyllithium, n-decyllithium, phenyllithium, 1-naphthyllithium, p-tolyllithium, cyclohexyllithium, eicosyllithium, and mixtures thereof.

Such hydrocarbyl monolithium initiators are employed in an amount effective for substantial polymerization of the monomer charge to the molecular weight desired. Typically, an amount of such initiator would be in the range from about 0.1 to about 100 millimoles per 100 grams of total monomers.

The polymerization process of this invention is usually carried out in the presence of a diluent. Suitable diluents are materials which are not detrimental to the polymerization process. Such materials include paraffinic, cycloparaffinic, and aromatic hydrocarbons, and mixtures thereof. Examples of such diluents include n-hexane, n-heptane, 2,2,4-trimethylpentane, cyclopentane, cyclohexane, benzene, toluene, and the xylenes. The quantity of diluent employed can vary broadly. A typical polymerization employs the diluent in a quantity (by weight) within the range from about 5 to about 10 times the weight of all the monomers used.

Polymerization can be carried out at any suitable temperature employed in the solution polymerization arts. Suitable temperatures will generally lie in the range of from about $-30°$ to about 200° C. Due to convenience, the range from about 40° to about 100° C. will preferably be used.

Suitable pressures for the polymerization are pressures which are sufficient to maintain monomers and diluent substantially in the liquid phase.

The polymerization time can be selected over a wide range and will, of course, be affected by polymerization temperature chosen. The time preferably should be chosen such that substantially complete conversion of monomer(s) to polymer(s) is obtained; and normally polymerization times range from a few minutes to several hours.

The polymerization can be conducted by any suitable method, for example, by sequential monomer addition or by polymerization of monomer mixtures, the method chosen being dependent upon the type of polymer desired. The polymerization can be conducted by batch or by continuous processes.

Various substances are known to be detrimental to the initiator and/or the living polymers of this invention. These detrimental substances include, for example, carbon dioxide, oxygen, and water. Therefore, it is highly desirable that the reactants, the polymerization apparatus, the diluents (if present), and the reactant mixture be substantially free from such materials as well as from any other materials which inactivate the respective reactive species used in the polymerization process. Any suitable method for removing such contaminants can be used.

In the coupling reaction, the temperature and pressure are normally maintained the same as those used during the polymerization for convenience, although the same conditions are not a requirement of the invention. The time required for the coupling reaction can be selected over a wide range but is normally within the range from about 1 minute to about 1 hour and often is within the range from about 10 minutes to about 30 minutes.

The method of the coupling reaction of copolymers of conjugated diene monomers and monovinylarene monomers is summarized as follows: after charging the chosen monomers and polymerization initiator to the polymerization zone and after allowing polymerization to be substantially completed (during which polymerization the living polymers as described above are formed), an orthoester is charged to the polymerization zone. Based upon the data in the examples below, it is expected that if the polymer lithiums are monovinylarenyllithium terminated, coupling will occur; however, if the living polymers are conjugated dienyllithium-terminated, essentially no coupling will occur. The orthoester is combined with the polymer lithium in a way such that adequate mixing of these reactants occurs.

If monovinylarene homopolymers are to be coupled, the orthoester can be charged to the polymerization zone at any time, such as for example at the beginning of polymerization, during the polymerization, or after polymerization is completed. Often, the orthoester will be charged after polymerization of monovinylarene monomers has begun or at any time thereafter.

After the coupling reaction either of monovinylarene living homopolymers or of living copolymers of monovinylarene monomers and conjugated diene monomers, as described above, is substantially complete, an antioxidant can be added to the mixture as desired. The polymer can be isolated from the polymerization mixture by any suitable technique, for example, coagulation by treatment with a lower alcohol or water (or alternatively by treatment of steam stripping). Next, the mixture will generally be filtered. Finally, any desired purification steps can be carried out.

The coupled product will generally have a degree of coupling between two and three. A degree of coupling of two indicates a linear product; whereas, when the degree of coupling is greater than two, there will generally be a mixture of linear and so-called radial (or star-shaped) coupled products.

EXAMPLES

In the following examples, triethyl orthoformate (TEOF) was used as the coupling agent. The polymers were prepared according to the recipe given in each respective example, and the charge order was that order stated in each respective recipe. A summary of the characteristics of each coupled polymer is given in each example.

The first two examples demonstrate that monovinylarenyllithium-terminated living polymers are coupled by the use of TEOF whereas the next two examples demonstrate that butadienyllithium-terminated living polymers are essentially not coupled by the use of TEOF. The fifth example illustrates that a butadienyllithium-terminated living polymer can be coupled with TEOF if it is converted to a styryllithium-terminated living polymer by adding a small amount of styrene along with the TEOF. The sixth example illustrates the general lack of coupling of a monovinylarenyllithium-terminated living polymer which has been converted to a butadienyllithium-terminated living polymer by adding butadiene in admixture with the TEOF. It is believed that the results in Example V are consistent with the results in Examples I and II and that the results in Example VI are consistent with the results in Examples III and IV. The material which is added along with the TEOF in each respective example is believed to add onto the living polymer molecules which have formed in each respective example.

The degree of coupling is defined as the number of living polymer molecules attached to one molecule of coupling reagent and is determined from the gel permeation chromatography (GPC) curve using the formula $$\frac{V_c}{V_u} = (3p - 2)^{\frac{1}{2}} p^a,$$

wherein $V_c$ and $V_u$ are the hydrodynamic volumes of the coupled and uncoupled polymers, respectively, taken from the universal curve GPC calibration charts and a is the exponent from the intrinsic viscosity equation, $[\eta] = Kma$, wherein $[\eta]$ is the intrinsic viscosity, M is the viscosity molecular weight, and K and a are constants for a given polymer-solvent system. See G. Kraus and C. J. Stacy, J. Poly. Sci., A-2, 10, 657 (1972).

Coupling efficiency is defined as the percentage of the living polymer molecules which are incorporated into the coupled polymer. The coupling efficiency is calculated from the GPC curve by dividing the area under the peak representing the coupled polymer by the sum of the areas under the peaks representing the coupled and the uncoupled polymers and multiplying the dividend by 100.

EXAMPLE I

This example illustrates the coupling of living 75/25 butadiene/styrene tapered copolymer by addition of triethyl orthoformate as the coupling agent to the reaction mixture (after substantially complete conversion of monomers to polymer). The polymer was prepared according to recipe 1, the ingredients having been added in the order listed below.

| Recipe 1 | |
| --- | --- |
| Step I | |
| Cyclohexane, parts by weight[a] | 760 |
| 1,3-Butadiene, parts by weight | 75 |
| Styrene, parts by weight | 25 |
| n-Butyllithium, mhm[b] | 1.0 |
| Polymerization Temperature, °C. | 70 |
| Polymerization Time, hours | 1.0 |
| Step II | |
| Triethyl orthoformate, moles per mole of lithium in polymer | 6.8 |
| Reaction Temperature, °C. | 70 |
| Reaction Time, hours | 0.25 |

[a] parts by weight per total weight of mixture in recipe.
[b] mhm = millimoles per 100 grams of total monomers Since during the preparation of a tapered copolymer block, the tendency of the conjugated diene to be incorporated in a copolymer block greatly exceeds that tendency of the monovinylarene monomer, the composition of the polymer gradually changes from that of essentially pure poly(conjugated diene) to that of essentially pure poly-(monovinylarene). Therefore, the tapered living polymers in Example I will be monovinylarenyllithium-terminated.

The GPC curve of the isolated polymer was bimodal, indicating coupling; and the degree of coupling was calculated as described above to be 2.2, with 27.5 percent coupling efficiency. A non-coupled polymer, obtained by isolating polymers immediately following Step I, had a monomodal GPC curve, the peak of the curve occurring at a retention time equivalent to that of the low molecular weight peak of the GPC curve of the coupled polymer.

EXAMPLE II

This example illustrates the coupling of a living 70/30 butadienestyrene block copolymer having terminal styryllithium by addition of triethyl orthoformate to the reaction mixture after substantially complete conversion of monomers to polymer.

Polymers were prepared according to recipe 2.

| Recipe 2 | |
| --- | --- |
| Step I | |
| Cyclohexane, parts by weight | 760 |
| 1,3-Butadiene, parts by weight | 70 |
| n-Butyllithium, mhm | 1.0 |
| Polymerization Temperature, °C. | 70 |
| Polymerization Time, hours | 1.0 |
| Step II | |
| Styrene, parts by weight | 30 |
| Polymerization Temperature, °C. | 70 |
| Polymerization Time, hours | 0.5 |
| Step III | |
| Triethyl orthoformate, moles per mole of lithium in polymer | Variable (See Table I) |
| Cyclohexane, parts by weight | Variable (See Table I) |
| Reaction Temperature, °C. | 70 |
| Reaction Time, hours | 0.75 |

Two polymers were prepared according to recipe 2, using two levels of triethyl orthoformate shown in Table I. The properties of the isolated polymers are given in Table I.

TABLE I

| Polymer | Triethyl Orthoformate, moles per mole of lithium in polymer | Degree of Coupling | Coupling Efficiency, percent |
|---|---|---|---|
| A | 0.5[a] | 2.6 | 20.6 |
| B | 3.4[b] | 2.1 | 17.6 |

[a]Added as a 0.1 molar cyclohexane solution
[b]Added neat (undiluted)

These data illustrate that a 70/30 butadiene-styrene block copolymer containing terminal styryllithium is coupled by triethyl orthoformate when the coupling agent ratio range is 0.5 to 3.4 moles per mole of lithium in polymer, regardless of whether the TEOF is added neat or diluted with cyclohexane. From these data, it is expected that there will be some coupled product at any ratio of moles of orthoester coupling agent to moles of lithium in polymer, provided that the living polymer to be coupled is monovinylarenyllithium-terminated.

EXAMPLE III

This example illustrates the essential lack of coupling of polybutadienyllithium-terminated homopolymer by triethylorthoformate, the coupling agent having been added after substantially complete conversion of monomer to polymer.

Polybutadiene homopolymer was prepared according to Recipe 3, given below.

| Recipe 3 | |
|---|---|
| Step I | |
| Cyclohexane, parts by weight | 760 |
| 1,3-Butadiene, parts by weight | 100 |
| n-Butyllithium, mhm | 1.0 |
| Polymerization temperature, °C. | 70 |
| Polymerization time, hours | 1.0 |
| Step II | |
| Triethylorthoformate, moles per mole of lithium in polymer | 6.8 |
| Polymerization temperature, °C. | 70 |
| Polymerization time, hours | 1.0 |

The GPC curve of the isolated polymer indicated that a small amount of coupling had occurred, as evidenced by a shoulder on the high molecular weight side of the uncoupled polymer peak. It is believed that this shoulder was due to coupling by oxygen, which was inadvertently introduced into the system with one of the ingredients. It is believed that essentially no coupling by TEOF occurred.

EXAMPLE IV

This example illustrates the essential lack of coupling of block copolymers containing terminal butadienyllithium with triethyl orthoformate.

Four 70/30 butadiene-styrene block copolymers containing terminal butadienyllithium were prepared using typical sequential monomer addition techniques. Addition of variable amounts of triethyl orthoformate to these living polymers (following the substantially complete conversion of monomer to polymer) gave results as described in Table II.

TABLE II

| Polymer | Triethyl Orthoformate, moles per mole of lithium in polymer | Degree of Coupling | Coupling Efficiency, percent |
|---|---|---|---|
| E | 0.5[a] | 3.2 | 1.8 |
| F | 3.4[b] | 2.0 | 29 |
| G | 3.4[c] | 0 | 0 |
| H | 6.8[b] | 0 | 0 |

[a]0.1 molar solution in cyclohexane
[b]Neat (undiluted)
[c]0.034 M solution in cyclohexane The low level of coupling for Polymer E is believed to be due to coupling by oxygen which was inadvertently introduced with one of the ingredients, rather than by being due to coupling with TEOF.

No coupling was observed with Polymers G and H. The high level of coupling observed with Polymer F is not understood, particularly in view of the results obtained for similar Polymer G. Therefore, the coupling of Polymer F is not believed to have been a reliable experiment.

It is believed that the results in Example IV generally support the results in Example III, wherein polymer having terminal butadienyllithium was essentially not coupled with TEOF.

EXAMPLE V

This example illustrates the coupling of living 70/30 butadienestyrene block copolymer having terminal butadienyllithium which are converted to terminal styryllithium groups by the addition of a small amount of styrene which was in admixture with the triethyl orthoformate, the addition being made after the polymerization of the butadiene block is complete.

Two polymers were prepared according to recipe 4, using two different amounts of triethyl orthoformate indicated in Table III.

| Recipe 4 | |
|---|---|
| Step I | |
| Cyclohexane, parts by weight | 760 |
| Styrene, parts by weight | 30 |
| n-Butyllithium, mhm | 1.0 |
| Polymerization Temperature, °C. | 70 |
| Polymerization time, hours | 0.5 |
| Step II | |
| 1,3-Butadiene, parts by weight | 70 |
| Polymerization Temperature, °C. | 70 |
| Polymerization time, hours | 1.0 |
| Step III | |
| Styrene, parts by weight | 1 |
| Triethyl orthoformate, moles per mole of lithium in polymer | Variable |
| Cyclohexane, parts by weight | Variable |
| Polymerization Temperature, °C. | 70 |
| Polymerization time, hours | 0.75 |

The GPC curves of the isolated polymers were bimodal, indicating the presence of coupled product in both polymers, as summarized in Table III.

TABLE III

| Polymer | Triethyl Orthoformate, moles per mole of lithium in polymer[a] | Degree of Coupling | Coupling Efficiency, percent |
|---|---|---|---|
| C | 0.5[b] | 2.3 | 24.2 |
| D | 3.38[c] | 2.0 | 28.9 |

[a]Added with 1 part by weight styrene per 100 parts by weight of total monomers.
[b]Added as a 0.1 M cyclohexane solution.
[c]Added neat.

The results in Table III show the coupling of a 70/30 butadienestyrene block copolymer containing terminal butadienyllithium which was converted to terminal styryllithium by the addition of styrene which was in admixture with the triethyl orthoformate.

EXAMPLE VI

This example has been added for completeness and is believed to generally illustrate the lack of coupling of living 70/30 butadiene-styrene block copolymer, the styrene block having first been formed and the triethyl orthoformate then having been added concurrently (as a mixture) with the butadiene to the polymerization mixture.

A 70/30 butadiene-styrene block copolymer was prepared according to Recipe 4 by first forming the styrene block. The triethyl orthoformate was added in a cyclohexane solution with the butadiene to the polystyryllithium polymerization mixture.

| Recipe 5 | |
|---|---|
| Step I | |
| Cyclohexane, parts by weight | 760 |
| Styrene, parts by weight | 30 |
| n-butyllithium, mhm | 1.0 |
| Polymerization Temperature, °C. | 70 |
| Polymerization time, hours | 0.5 |
| Step II | |
| Cyclohexane, parts by weight | 180 |
| 1,3-Butadiene, parts by weight | 70 |
| Triethyl orthoformate, moles per mole of lithium in polymer | 6.8 |
| Polymerization Temperature, °C. | 70 |
| Polymerization time, hours | 0.5 |

Data in Table IV illustrate the variable coupling of these living polymers with triethyl orthoformate, using this above-described method of coupling agent addition.

TABLE IV

| Polymer | Triethyl Orthoformate, moles per mole of lithium in polymer | Degree of Coupling | Coupling Efficiency, percent |
|---|---|---|---|
| I | 3.4 | 0 | 0 |
| J | 6.8* | 5 | 73 |

*Prescavenged with 0.7 mhm n-butyllithium prior to its introduction into the polymerization reaction mixture.

When TEOF was added in the cyclohexane solution as described above, coupling of butadienyllithium-terminated living polymers was variable, no observed coupling occurring at 3.4 moles of TEOF per mole of lithium in polymer but 73 percent coupling efficiency occurring at 6.8 moles of TEOF per mole of lithium in polymer.

It is believed that the high level of coupling in Polymer J shown in Table IV is due to the prescavenging step used in the production of Polymer J, this step of pretreatment resulting in the transformation of all or part of the TEOF to a compound which effectively coupled butadienyllithium-terminated living polymers. Therefore, it is believed that the experiments in this example demonstrate that TEOF itself does not effectively couple butadienyllithium-terminated living polymers.

Although this invention has been described in detail with various examples, it is not to be limited by those examples. Rather, the invention is intended to include modifications which would be apparent to one with ordinary skill in the art.

What is claimed is:

1. A method of producing coupled monovinylarene homopolymers, said method comprising:
   (a) forming a polymerization mixture comprising (1) at least one monomer selected from the group consisting of monovinylarenes and (2) an organo alkali metal initiator;
   (b) polymerizing said at least one monomer so as to form living homopolymer molecules;
   (c) coupling said living homopolymer molecules with an orthoester, said orthoester having the formula

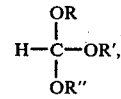

wherein R, R', and R" are the same or different and are individually selected from alkyl groups.

2. A method according to claim 1, wherein said orthoester is added to said polymerization mixture at the beginning of polymerization, during the polymerization, or after polymerization is completed.

3. A method according to claim 2 wherein said monovinylarenes have 8 to about 20 carbon atoms per monomer unit, wherein said alkali metal is lithium, and wherein R, R', and R" are alkyl groups having from 1 to about 4 carbon atoms per alkyl group.

4. A method according to claim 3 wherein said orthoester is triethyl orthoformate.

* * * * *